United States Patent [19]
Lee et al.

[11] Patent Number: 5,099,346
[45] Date of Patent: Mar. 24, 1992

[54] INFRARED COMMUNICATIONS NETWORK

[75] Inventors: Richard M. Lee, Wilmette, Ill.; Gary T. Cromack, Greenfield, Mass.

[73] Assignee: Spectrix Corporation, Evanston, Ill.

[21] Appl. No.: 149,049

[22] Filed: Jan. 27, 1988

[51] Int. Cl.$^5$ ............ H04B 10/20; H04B 10/00; H04J 14/00

[52] U.S. Cl. ............ 359/118; 359/110; 359/121; 359/143; 359/165; 359/174

[58] Field of Search ............ 455/601, 603, 606, 607; 359/110, 118, 121, 143, 165, 174

[56] References Cited

U.S. PATENT DOCUMENTS

| | | |
|---|---|---|
| 3,501,640 | 3/1970 | Harris . |
| 3,705,986 | 12/1972 | Sanders et al. . |
| 3,717,844 | 2/1973 | Barret et al. . |
| 4,063,083 | 12/1977 | Cathey et al. . |
| 4,213,119 | 7/1980 | Ward et al. . |
| 4,229,829 | 10/1980 | Grunwald . |
| 4,276,656 | 6/1981 | Petryk, Jr. . |
| 4,313,227 | 1/1982 | Eder . |
| 4,330,870 | 5/1982 | Arends . |
| 4,402,090 | 8/1983 | Gfeller et al. . |
| 4,494,185 | 1/1985 | Gunderson et al. . |
| 4,649,385 | 3/1987 | Aires et al. . |
| 4,654,890 | 3/1987 | Hasegawa et al. ............ 455/607 |
| 4,809,257 | 2/1989 | Gantenbein et al. ............ 455/607 X |
| 4,850,047 | 7/1989 | Iguchi et al. ............ 455/607 X |

OTHER PUBLICATIONS

Citta, R., An Infra-Red Wireless Speaker System Utilizing A Super Wideband FM Carrier, IEEE Transactions on Consumer Electronics, vol. CE-21, No. 2, May 1975, pp. 115-119.

Gfeller, Fritz R. and Urs Bapst, 1979, Wireless In--House Data Communication via Diffuse Infrared Radiation, Proceedings of the IEEE 67, No. 11 (Nov.), 1474-1486.

Kotzin, Michael D. and Anthony P. van den Heuvel, A Duplex Infrared System for In-Building Communications, Motorola Inco., Communications Sector Research, Schaumburg, Ill., IEEE 1986.

Kotzin, Michael D., 1981, Short-Range Communications Using Diffusely Scattered Infrared Radiation, Ph.D. diss., Department of Electrical Engineering and Computer Science, Northwestern University, Evanston, Ill. (Jun.).

Parkin, I. A. and J. Zic, 1983, An Application of Infra-Red Communications, Paper E1220, Basser Department of Computer Science, University of Sydney (Oct.).

Minami, Takatoshi, Kenjiro Yano and Takashi Togue, 1983, Proceedings of the National Computer Conference, American Federation of Information Processing Scieties, Inc. (Nov.), 721-728.

Stallings, W. Local Network Performance, IEEE Communications Magazine, Feb. 1984, vol. 22, No. 2, pp. 27-36.

Lewis, James G. and Kay Baker, 1984, Alternative to Microwave, Infrared Wins Short-Haul Run, Data Communications (Nov.), 185-192.

Bond, John and Les Crane, 1984, Infrared Radiation: A Free-Space Transmission Alternative, Telesis Journal, Bell Northern Research, Ltd., Ottawa, Canada (Nov.), 2-7.

Yen, Chu-Sun and Richard D. Crawford, 1985, The Use of Directed Optical Beams in Wireless Computer Communications, Paper delivered at GlobeComm '85 Conference, IEEE (Dec. 3-5), 1181-1184.

(List continued on next page.)

Primary Examiner—Stephen C. Buczinski
Attorney, Agent, or Firm—Welsh & Katz, Ltd.

[57] ABSTRACT

An infrared data communications network in which groups of personal computers and associated peripherals may communicate by infrared signals with each other. The system utilizes a error correction and a packet switched protocol which allows any terminal to select communications with any other terminal or terminals without degradation of the error rate. Error free transmission is maintained by means of error correcting encoding and a handshake protocol. The packet switched protocol permits any terminal to function as a store and forward repeater thus making the system more reliable and less susceptible to beam blockage.

17 Claims, 11 Drawing Sheets

OTHER PUBLICATIONS

Subbarao, Wunnava V., 1985, Simple Through-Air IR Transmitter and Receiver, Laser Focus/Electro-Optics (Mar.), 100–102.

Pahlavan, Kaveh, 1985, Wireless Communications for Office Information Networks, IEEE Communications Magazine 23, No. 6 (Jun.), 19–27.

Nakata, Yukio et al., 1985, In-House Wireless Communication System Using Infrared Radiation, The New World of the Information Society, J. M. Bennett and T. Pearcey, eds. (North Holland: Elsevier Science Publishers B.V.), 333–337 (Nov.).

T-1 Atmospheric Infrared Transmission System, 1986 Product Information and Price Sheet, American Laser Systems, Inc., Goleta, Calif. (Feb.).

Forrest, Stephen R., 1986, Optical Detectors: Three Contenders, IEEE Spectrum (May), 76–84.

Satoh, Akio and Eiichi Ogawa, 1986, Fundamental Characteristics of In-House Infrared Propagation and Environmental Noise, Proceedings of AP-S International Symposium, IEEE (Jun. 8–18), 205–208.

Georgopoulos, Chris J. and A. K. Kormakopoulos, 1986, A 1-Mbit/s IR LED Array Driver for Office Wireless Communication, IEEE Journal of Solid-State Circuits SC-21, No. 4 (Aug.), 582–584.

Time Division Pulse Modulation, 1986, IBM Technical Disclosure Bulletin 29, No. 1 (Jun.), 280–282.

Kavehrad, M. and P. J. McLane, 1987, Spread Spectrum for Indoor Digital Radio, IEEE Communications Magazine 25, No. 6 (Jun.), 32–40.

Li, Victor O. K., 1987, Multiple Access Communications Networks, IEEE Communications Magazine 25, No. 6 (Jun.), 41–48.

Chu, T. S. and M. J. Gans, 1987, High Speed Infrared Local Wireless Communication, IEEE Communications Magazine 25, No. 8 (Aug.), 4–10.

Acampora, A. S. and J. H. Winters, 1987, System Applications for Wireless Indoor Communications, IEEE Communications Magazine 25, No. 8 (Aug.), 11–20.

Durham, Tony, 1979, Infrared Light for a New Wireless Revolution, New Scientist 20/27 (Dec.), 931–933.

64-Kbit/s Atmospheric Infrared System Transmits Data Within a Room for IBM, 1980, Laser Focus (Feb.), 56.

Microbroadcasting, 1980, Scientific American (May).

VW Factory to Use Atmospheric IR Links to Enter Data Into a Central Computer, 1980, Laser Focus (Jun.).

Infrared Ray Gun Used to Read House Meters, 1982, Pipe Line Industry (Sep.), 26.

Godin, Roger J., 1983, Astronauts to Talk Via Infrared Headsets, Electronics Magazine (Aug. 11), 48–49.

Hartman, Thom, 1984, Wireless Computers, Popular Computing (Feb.), 64 and 70.

Ranalli, Carol, 1985, Infrared Link Replaces Cables, InfoWorld (Jan. 21), 21.

Infrared Links?, 1985, Computer Decisions (Jan. 29), 41.

Article excerpt, Consumer and aboard jet aircraft use of audio-over-IR products discussed, plus sophisticated IR video controllers, Popular Mechanics, Mar. 1986, pp. 110–111.

Lawson, Michael, 1986, Brilliant They May Be. Still, Users Take Light Links Lightly, Data Communications (Jun.), 72 and 76.

New Products: Ethernet Repeater Beams Infrared Data at 10 Mbit/s to LAN Sites Cable Can't Reach, 1987, Data Communications (May), 231.

Kavehrad, Mohsen, 1987, Guest Editorial in IEEE Communications Magazine 25, No. 6 (Jun.), 4.

L. Teschler, "Broadcasting by Light Beam: Digital Control with Infrared Light," Machine Design (Nov. 1980), pp. 74–78.

INFRARED COMMUNICATIONS NETWORK

BACKGROUND OF THE INVENTION

This invention relates generally to the field of data communications networks and more particularly to an infrared communications network in which groups of personal computers and peripherals may communicate by infrared signals with each other and with other associated peripheral devices.

Personal computers have become widely used, creating a need to connect many such computers to each other or to a wide variety of peripherals. Typically, computers are connected to peripherals or other computers by hard wire. However, low cost cable communications interfaces (i.e. parallel printer ports or RS-232 serial ports) are limited in the distance they can reliably transfer data. Moreover, coaxial cable, which is used for considerably longer distance hard wire communications, requires a relatively expensive terminal interface and therefore isn't widely used for connecting peripheral devices to computers. As a result, peripheral devices in general must be co-located with a host computer. In addition, when using a hard wired approach to connecting terminals moving a terminal usually involves costly office building rewiring if the cables are installed properly to meet required electrical and fire safety standards.

Many users of computers need the capability to connect to several peripheral devices (e.g., disk memory, monitors, plotters, printers, modems, etc.), although not simultaneously. For example, a low quality printer (e.g., dot matrix) may be used for draft copies of word processing documents, while a higher grade letter quality printer may be used for the final copy. Also, relatively high cost, high quality, computer printing devices (e.g. laser printers) may only be cost effectively utilized if many computers or word processing terminals are able to share them. This need to share peripherals creates an additional problem by requiring the users to insert additional devices between multiple computers and the shared peripheral(s). The prior art hard wire solution to this problem of sharing peripherals has been to used manually operated selector switches, patch panels, or to simply manually make the cable connection as needed. However, while manually switching solves the connection problem, the greater problem of flow control (i.e. sending data only after a correct connection has been established) also must be manually supervised. Manual flow control supervision is difficult and susceptible to error, therefore results in lost transmissions if shared peripheral devices are not located conveniently in the same room as the computer that shares them. Thus, multiple cable hard wired systems are limited in that they are expensive to install and if not enclosed create safety hazards and aesthetic clutter. In addition each device must be physically, individually wired, each interface must match mechanically and electrically, and each path is dedicated and thus has limited, if any, multiple access to all of the installed functions.

Non-hard wired, one-way data communication systems which employ modulated infrared or radio frequency signals to transfer information are not unknown in the art. Radio frequency systems create serious problems due to interference and the need for relatively wide band-width as well as governmental licensing and regulation problems. One-way infrared systems exist in the prior art using modulated infrared signaling, for example, television remote control devices and wireless stereo headphones. However, the techniques used in such one-way systems are not suitable for the high level (i.e. 100%) end-to-end transmission accuracy required for communications between computer systems and peripheral devices.

Some two way infrared communication systems are known in which all terminals are synchronized to a host computer. One two-way system known in the art comprises the plurality of satellite stations used to cover an extended area. However, this system is limited in that it uses separate down-link and up-link subcarriers and requires centralized control of the system for proper operation of terminals. This system is primarily suitable to terminal to host computer communications and not for terminal to terminal communications.

Whether a one way or two way system is used, prior art systems are additionally limited in that beam blockage creates lack of adequate up time reliability and increases the error rate. In addition, these systems are limited in range (some are well under 50 feet). Also, prior art systems lack data security allowing any receiving device within range to intercept data transmissions.

Accordingly, it is an object of this invention to provide a novel low cost infrared communications network which enables two-way error free transfer of data between terminals while accommodating breaks in the direct optical path.

It is another object of the invention to provide a novel infrared communication system utilizing a packet switching protocol, which allows any terminal to select communications with any other terminal or terminals without degrading the error rate.

It is yet another object of the invention to provide a novel infrared communication system which employs a packet switching protocol permitting any terminal to function as a store and forward repeater.

Briefly, according to one embodiment of the invention a novel communication system is provided using infrared signals to provide two-way error free transfer of data between a plurality of computers or terminals.

BRIEF DESCRIPTION OF THE DRAWINGS

The invention, together which further objects and advantages thereof, may be understood by reference to the following description taken in conjunction with the accompanying drawings.

DETAILED DESCRIPTION OF THE PREFERRED EMBODIMENT

Figure 1A:
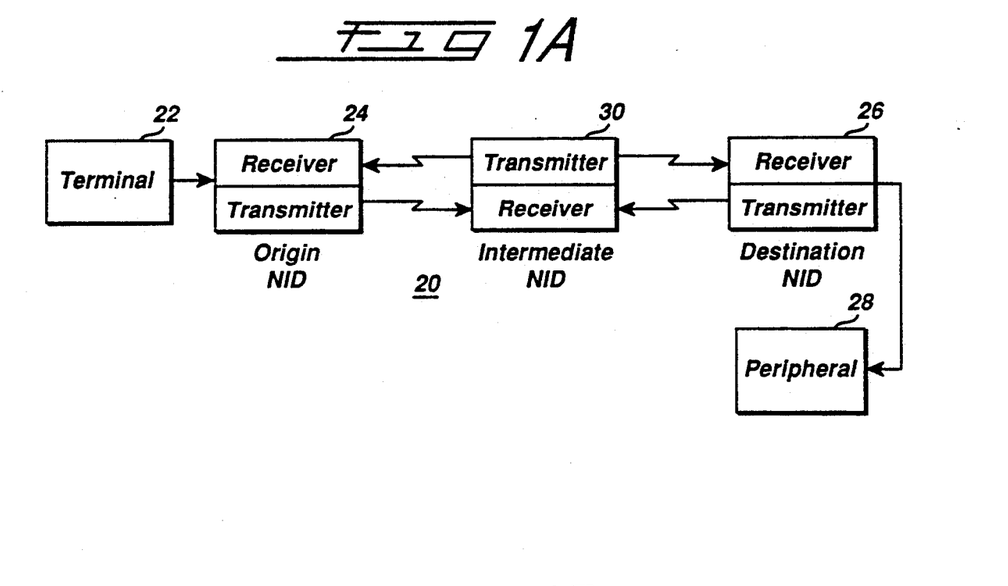
FIG. 1A is a generalized block diagram illustrating one specific embodiment of an infrared communication system according to the invention.

FIG. 1A is a generalized block diagram illustrating a specific embodiment of a simple infrared communication system 20 according to the invention. In the infrared communication system 20 a terminal 22 couples data to be transmitted to an infrared transmitter/receiver 24 (i.e. a network interface device), as shown. The transmitter/receiver 24 encodes and transmits the data along with address information via an infrared communications link to another transmitter/receiver 26. The transmitter/receiver 26 decodes the address and the data of the received information packet, and couples the result to a peripheral device 28, such as a printer. Data transmission can also be in the opposite direction from the peripheral 28 to the terminal 22. Optionally, the transmitted data can be received and retransmitted by an intermediate transmitter/receiver 30 functioning as a repeater, as shown.

Figure 1B:
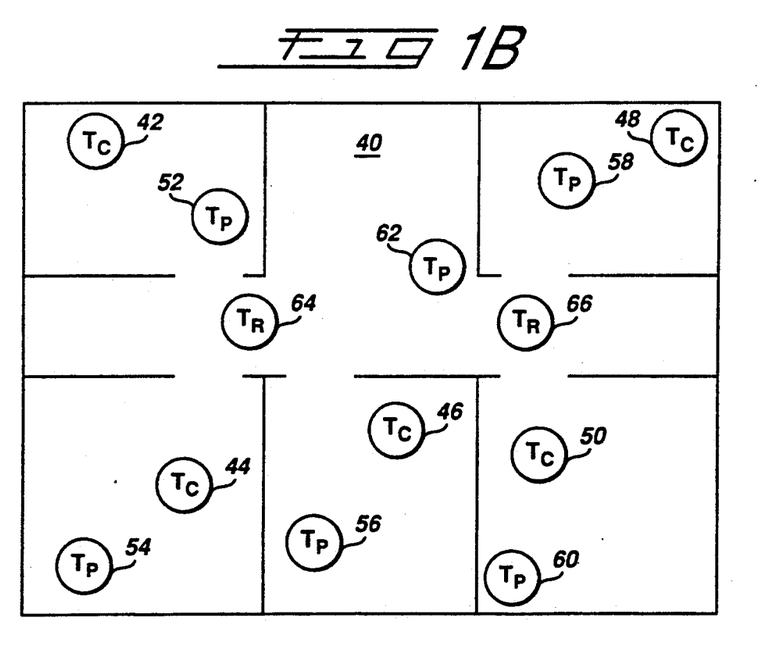
FIG. 1B is a generalized diagrammatic illustration of a specific embodiment of an overall layout of an infrared communication system according to the invention.

Referring now to FIG. 1B, there is shown a diagrammatic overview of a specific multi-room office layout of an infrared communication system 40 according to the invention. A variety of terminal stations each with a network interface device are distributed throughout the office area, including several computer terminals (Tc) 42, 44, 46, 48, 50 each associated with a host personal computer, several terminals associated with a peripheral device (Tp) 52, 54, 56, 58, 60 and 62 and several terminals (Tr) 64, 66 which are not associated with any device and which function as repeater units only.

Each of the terminals of the communication network 40 of FIG. 1B can communicate with any other terminal or group of terminals with each capable of receiving, transmitting, or alternatively act as a store and repeat station. For example, the computer terminal 42 may communicate with the peripheral terminal 52 directly, and may use the terminals 64 and 66 as repeaters to communicate the signal to the peripheral terminal 58.

Figure 2A:
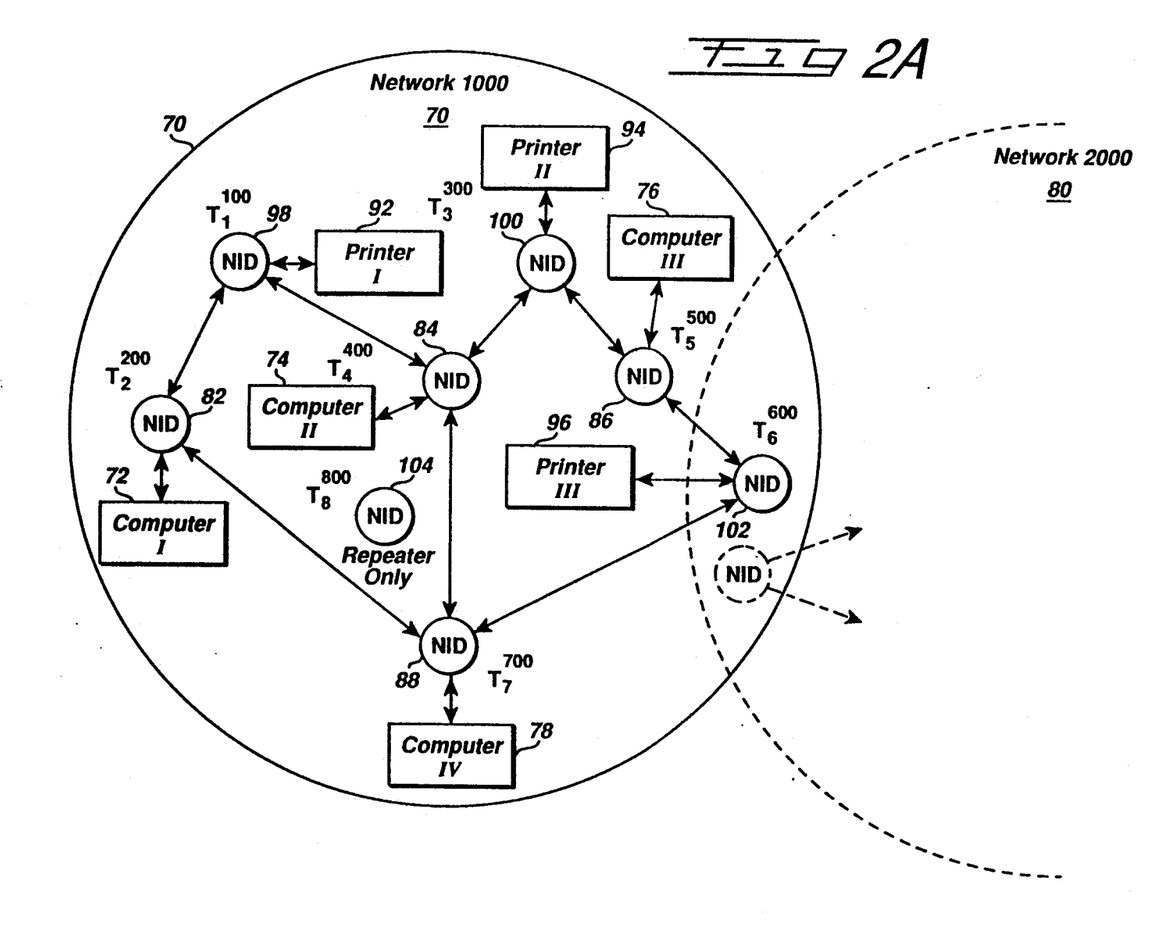
FIG. 2A is a generalized diagrammatic illustration of a specific embodiment of the infrared communication system showing grouping of terminals according to the invention.

FIG. 2A illustrates diagrammatically one of the terminal groupings possible for an infrared communications network 70 according to the invention. The network 70 is shown in detail in FIG. 2A while an adjacent network 80, in which the associated terminals are to be operated independently of the network 70, is illustrated by the dotted lines. The network 70 consists of several personal computers 72, 74, 76, 78 each coupled to a network interface device (NID) 82, 84, 86, 88, as shown. The network 70 also includes several printers (or other output peripherals) 92, 94, 96 each coupled to a NID 98, 100, 102, as well as an independent NID 104 which functions as a repeater only.

If hard wiring were employed as a means of sharing peripheral devices then a simple group, such as shown in FIG. 1, would be a personal computer wired directly to a peripheral device such as a printer. However, because the invention uses an infrared communication link, the connection between the terminals and peripherals are optical communication paths made through the network interface devices. In addition, the NID units utilize a packet switching protocol to transmit the data which allows dynamic assignment of groups of terminals. Thus, FIG. 2A represents only one of many possible states of the communication network 70. Each terminal is free to dynamically assign other terminals to a group or be assigned to other terminal groups as required by the communication requirements at any given time.

Figure 2B:
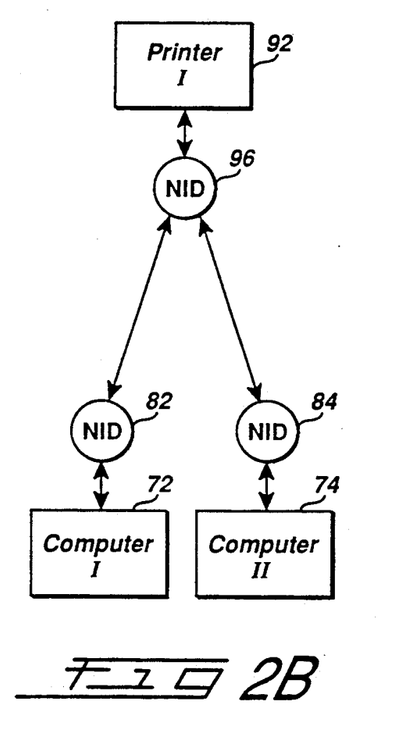
FIG. 2B is a generalized diagram of a specific embodiment of, a three terminal group within the infrared communication system of FIG. 2A.
Figure 2C:
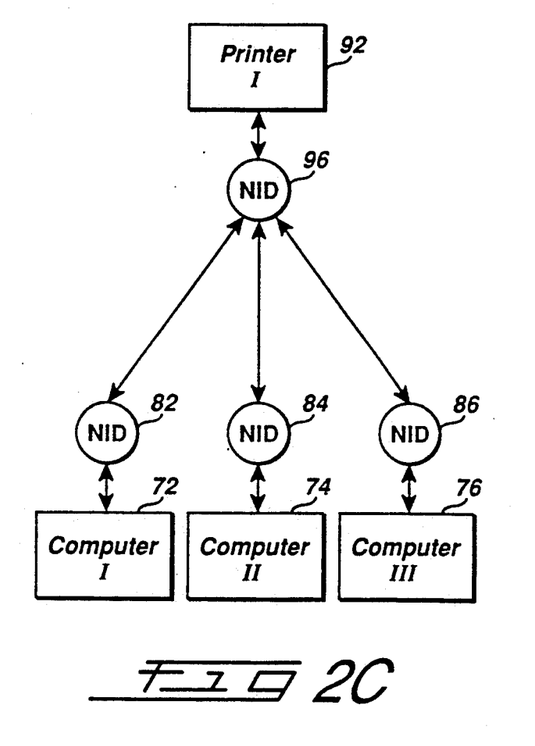
FIG. 2C is a generalized diagram of a specific embodiment of a four terminal group with multiple access within the infrared communications system of FIG. 2A.

As an illustration of some possible groupings, FIG. 2B illustrates a group of three terminal in which the printer terminal 92 is coupled via the network interface devices 96, 82, and 84 to the two personal computers 72, 74. In this group configuration, the NID 96 associated with the printers 92 can be configured to only allow one terminal to group with it at any one time. Thus, the printer may be shared by only one of the two computers at any given time. FIG. 2C illustrates a four terminal grouping of the printer 92 and three personal computers 72, 74, 76 configured such that more then one computer may communicate with the printer. When the network interface device 96 associated with the printer 92 has enough buffer capacity to store incoming data, it can grant grouping requests to more than one computer at a time. The process of granting more than one group request allows multiple personal computers to transfer their data to the network interface device associated with the printer which then stores the data until it can be printed. In this configuration, the first computer to form a group with the printer gets to use it first. Thus, in the group configuration of FIG. 2C the network interface device allows other computers to be grouped with it to the extent that it can buffer data to be printed later.

Figure 3:
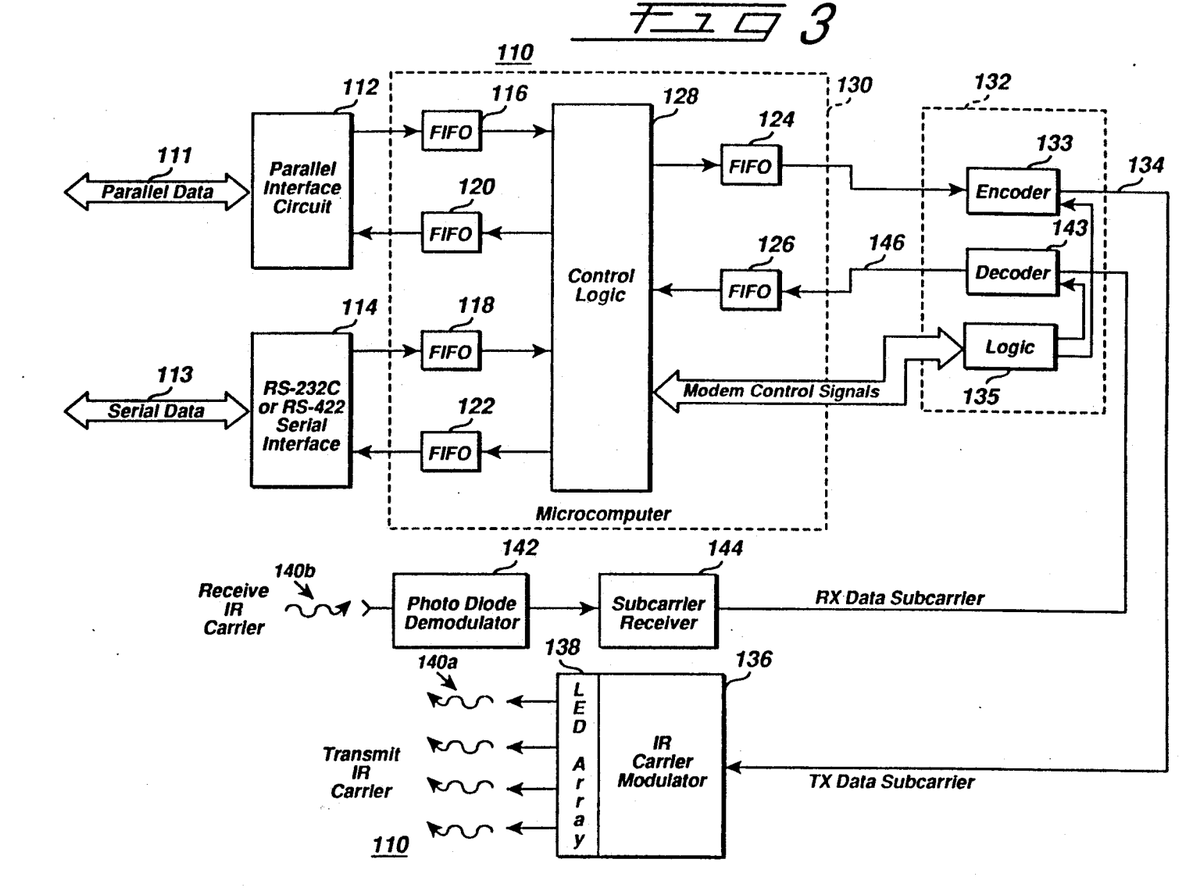
FIG. 3 is a detailed block diagram illustrating a specific embodiment of a network interface device (NID) according to the invention.

Referring now to FIG. 3, there is shown a detailed block diagram of a network interface device (NID) 110. The NID 110 is coupled to an associated terminal (not shown) via interface circuits comprising a conventional parallel interface circuit 112 and/or a conventional RS-232C or RS-422 serial communications interface circuit 114. Data coupled through the interface circuits 112, 114 from an associated terminal is coupled to and stored in a First-In-First-Out (FIFO) buffer 116, 118 until the data can be processed. If the NID 110 is connected to a terminal using a parallel (Centronics type) interface then parallel data to and from the terminal is connected via a parallel bus 111 through the parallel interface circuit 112 into the FIFO buffer 116. If the NID 110 is connected to a terminal using a serial (either RS-232 or RS-422) interface then serial data to and from the terminals is coupled via a serial bus 113 to the serial communications interface circuit 114 to the FIFO buffer 118. Similarly FIFO buffers 120, 122 are used to store data intended for the terminal device thus allowing the terminal device to fetch the incoming data only when it is ready to do so. On the optical link side, incoming and outgoing data packets are similarly buffered in FIFO buffers 124 and 126 under control of control logic circuitry 128.

In the illustrated embodiment, the control logic and FIFO functions are performed by a programmed microcomputer 130 consisting of a microprocessor (e.g., on Intel 8031), Random Access Memory (not shown), memory for a stored program (typically Read Only Memory, not shown) and conventional input/output interface circuits. Thus the term control logic refers to all the functions necessary for forming and dismantling data packets, performing forward error control and encoding, decoding, checking and correcting received bit errors and control of the overall interaction between the network interface device and the network (i.e. implementing the packet protocol).

A data packet is transmitted and received as a serial bit stream using Manchester encoding. For transmission, an encoder 133 under control of a central logic circuit 135 of a Manchester modem 132 converts 1 Megabit/s serial data from the FIFO buffer 124 to a 200 Megabuad data stream which is coupled to a serial output line 134. The 2 Megabuad data on the serial line 134 is coupled to a LED modulator 136 which intensity modulates an infrared LED Array 138. The result is an incoherent infrared carrier 140a modulated by a coherent data subcarrier.

During reception, a photodiode 142 is used to demodulate the received modulated infrared carrier 140b resulting in recovery of the transmitted subcarrier corrupted with noise. This signal is coupled, as shown, from the photodiode demodulator 142 to a subcarrier receiver 144 which removes enough of the channel noise so that a relatively noise-free subcarrier is generated and coupled to the Manchester modem 132 for demodulation. A Manchester decoder 143 within the Manchester modem 132 coherently demodulates the subcarrier by extracting the subcarrier (clock) frequency and producing a 1 Megabit per second receive data stream which is coupled to a serial line 146, as shown. The received data stream on the serial line 146 is stored in a FIFO buffer 126 and processed by the control logic 128. If the packet of data contains errors that are not correctable, the control logic includes means for handling uncorrectable packet errors which will be discussed hereinafter with regard to the packet protocol The processes for intensity modulating and demodulating a data subcarrier is well known in the art.

The data packets are transmitted asynchronously in both directions in the form of standard frames. The standard frames have a format which includes a preamble, followed by a synchronization word, a final destination address, an intermediate destination address, an origin address, a control field, a packet number, an information field and a CRC check character. The preamble comprises a stream of 101 alternating 1's and 0 bits for bit synchronization. This preamble is followed by a synchronization word composed of 11 bits for word synchronization. The final destination address comprises three bytes, the intermediate destination address comprises three bytes and the origin address comprises three bytes. The control field is three bytes in length, the packet number is one byte in length and the information field is a variable length with the CRC check character comprising two bytes.

The transmitted packets require an acknowledgement from the destination terminal. If an acknowledgement (ACK) or no acknowledgement (NAK) isn't received within a reasonable time the network interface device waits a random amount of time and retransmits the packet again. This handshake and retransmission scheme provides immunity to temporary path interruptions. Forward error control is optionally employed to statistically minimize the number of retransmissions required in order to further conserve the communication channel resources.

The network system 70 of FIG. 2A is configured dynamically by grouping of terminals. The smallest network group configuration consists of just two terminal units. Each terminal consists of a computer or peripheral device each connected to a network interface device (NID). Each NID is assigned a unique address and may establish two-way communications with any other NID, and therefore any other terminal, if the address of the other NID is known. To facilitate multiple access of terminals by other terminals, a terminal address is used which consists of three component parts. The composite terminal address (whether a destination, an intermediate or an origin address) is then the arithmetic sum of the three address components.

Each composite address consists of a network address component. Terminals with different network addresses are not allowed to communicate with each other. A second address component is the unique individual address of a terminal in the given network. The third component is a group identifier. Every terminal in a network is assigned a unique group identifier. The group identifier must be known by all terminals that wish to establish communications with each other. While this at first appears to be redundant since every terminal also has a unique individual address, it permits the terminal units to distinguish the message transfer packets from requests for grouping. For example, FIG. 2A shows a network 70 with a network address 1000 consisting of eight terminals. Each terminal (T) has a unique individual address (subscript) and a unique group identifier (superscript). For example, the computer-I 72 is identified in FIG. 2A as Terminal $T_2^{200}$, thus it has an individual address of 2 and a group identifier of 200. The individual addresses are programmed in to each NID at the time of installation and need not be known to any of the users of the network. However, the group identifiers must be known, either by a number or a name uniquely associated with them. Thus, if the computer-I 72 needs to use the printer-I 92, (i.e., form a group), then the computer-I 72 first asks the printer-I 92 for permission to use it. The composite final destination address which the computer-I 72 will use when directing packets to the printer-I 92 for the purpose of establishing groups is determined by adding the network address 1000 to the group address of the printer-I 72 which is 100 and the individual address, which for an indication of a group request is zero, resulting in a composite final destination address of 1100.

The composite origin address is computed in a similar manner except that the computer-I 72 includes its individual address component (i.e., 2). The resulting origin address of the computer-I 72 is then 1202. The computer-I 72 now sends a packet to the address 1100 marked with an origin address from address 1202. The purpose of the intermediate destination address will be discussed hereinafter with regard to store and forward feature of the network. No individual address in the illustrated embodiment can be zero so that any terminal can recognize a composite address ending in zero as a request for grouping.

The printer-I 92 will then respond to the request of the computer-I 72 with a packet containing a final destination address of 1202, an origin address of 1101, and control field information indicating whether the printer-I 92 is available for grouping. If the computer-I 72 and the printer-I 92 are able to form a group then the printer-I 92 and the computer-I 72 subsequently exchange packets using addresses which contain each terminal's individual address component. The computer-I 72 and the printer-I 92 continue to form a group until the computer-I 72 notifies the printer-I 92 that the group relationship can be terminated. Thus, the individual address component allows the terminal units to distinguish the message transfer packets from requests for grouping.

All packet transmissions are acknowledged by the recipient as received error free (ACK) or not received error free (NAK). If the originating terminal receives a NAK or fails to receive either an ACK or a NAK response within a reasonable time limit, it retransmits the packet.

Because of the FIFO buffer capabilities of the NID and the packet addressing method it is possible to form groups of more then two terminals. FIG. 2A also shows a three terminal group consisting of the printer-II 94, the computer-II 74, and the computer-III 76. The printer-II 94 may accept grouping requests from both the computer-II 74 and the computer-III 76. The first computer to be granted a group request will actually use the printer first. However, if the printer-II 94 has enough buffer capacity, it may allow itself to be grouped with other terminals. The data from subsequent terminals is placed in a printer queue (in the case of printer terminals) and is printed after the data from the computer-II 74. Because of the address format used in the packet protocol, the printer-II 94 will respond to requests for grouping if the associated packet sent to it has a final destination address of 1300. The printer-II 94 then keeps a log of the addresses of all the terminals it has formed groups with, in this case the computer-II 74 and the computer-III 76. Therefore, for the group in this illustrative example, the printer-II 94 will only accept message packets with final destination addresses of 1304 or 1305.

By providing NID units with the capability to also function as store and forward repeaters it is possible to extend the area over the which the network can operate. To do this however, requires that terminal units be selective in the decision to first become repeaters and second that they pass on the packets in a way that will not effect the overall end-to-end error performance of the network. To accomplish this, each NID unit not part of a message communications will monitor the packets transmitted by all neighboring units. Neighboring terminals are any terminal which have a direct two-way optical communications path with each other.

A monitoring NID records origin addresses contained in each message packet to update its local routing table. In FIG. 2A, the computer-IV 78 may wish to group with the printer-I 92. However, the computer-IV 78 can assume that the printer-I 92 is not one of its neighbors if the computer-IV 78 has not received any packets with the group identifier of the printer-I 92 as a component of both the final destination address and the intermediate destination address. Neighboring terminals send the same final destination and intermediate address. However, the computer-IV 78 may, for example, have the computer-I 72 and the computer-II 74 as its neighbors. Therefore, the computer-IV 78 can choose which other terminal, the computer-I 72 or the computer-II 74, to use as a store and forward repeater. While the computer-IV 78 at first doesn't know whether either possible repeater can communicate with the printer-I 92, it can learn this information by trying each neighbor (for example, the lowest numbered terminal first, i.e., computer-I).

Thus, the computer-IV 78 may send a request for grouping to the computer-I 72 but with the final destination address of the printer-I 92 (i.e. 1100) in the intermediate destination address of the computer-I 72 (i.e. 1200). The computer-I 72 in turn checks with the printer-I 92 to see whether it can form a group with it. If the printer-I 92 allows grouping with the computer-I 72, then the computer-I 72 forwards a "okay to group" packet to the computer-IV 78. If the computer-IV 72 agrees to become part of the group of computer-IV 78 under these conditions, then it will function as a store and forward repeater for the final destination addresses 1101 and 1707 (i.e. the printer-I 92 and the computer-IV 78 respectively). This same technique can be used for multiple hops to form a store and report link over a large distance. Additionally, NID units may be employed for the sole purpose of acting as store and forward repeaters. Such devices are configured to periodically broadcast their presence so other terminals can classify them as neighbors.

In the illustrated embodiment, each terminal can send a data packet at any time without restriction. This can result in some packet collisions for which retransmissions are necessary. As an alternative, each terminal could employ a carrier sense multiple access with collision detection (CSMA/CD) technique. However in the illustrated embodiment this method is primarily effective in facilitating multiple access for terminals of one area (i.e., neighborhood). Terminals belonging to the same network but different areas or neighborhoods (i.e. without a common direct optical link) could still produce collisions for a third terminal.

By extending the group identifier concept to the network address component level and applying a super network address component it is possible to provide two-way communications between different networks of terminals. If the networks are not co-located (e.g. they are located on different floors in a building) then hard wired terminal units can act as store and forward repeaters between networks. A NID would need to be placed in each network linked by other means such as hard wire, fiber optics cable etc.

Figure 4A:
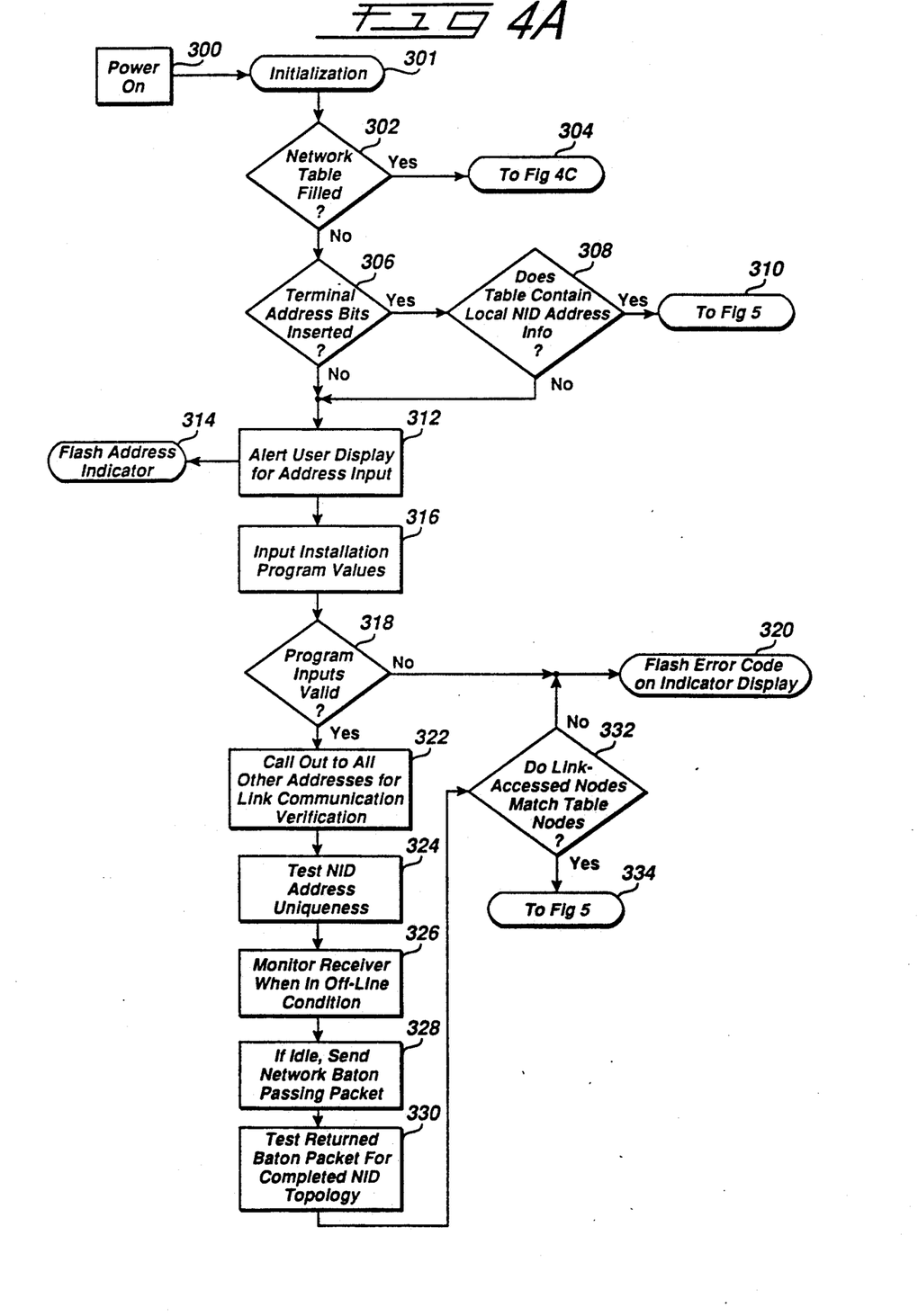
FIG. 4A, 4B, and 4C are a set of flow diagrams illustrating the processing methodology and structural flow diagrams illustrating the processing methodology for network initializing and updating by the processor for a specific embodiment of the infrared communication system according to the invention.

FIGS. 4A through 8 are flow diagrams illustrating the transceiver and repeater operation of each network interface device. FIG. 4A is a flow diagram illustrating the methodology and structural flow for the initialization of the network interface device in the infrared communication system immediately after power on, as indicated at blocks 300 and 301. Each NID is not allowed to communicate until all addresses have been updated since a power-up start has occurred. The initialization routine begins with a check to determine if the network table is filled and if the result is yes, program flow is directed to the network table updating routine, as illustrated at block 304 (illustrated in the block diagram of FIG. 4C). If the result at block 302 is negative program flow proceeds to a test to determine whether the terminal address bits have been inserted is illustrated at block 306. If the result is affirmative (indicating the terminal address has been entered), program flow branches to block 308 where the table contents are checked to determine if the table contains addresses of all local (i.e., neighboring) nodes. If the result is affirmative, program flow branches to the routine illustrated in FIG. 5. Each NID has a unique user insertable address which must be permanently placed into the NID address register at the time of installation. If this has not been done, the results at blocks 302 and 306 will be negative, and the user will be signaled as illustrated at blocks 312 and 314 to insert the address of its node. If the terminal address bits have been inserted then program flow will branch directly to the flow chart of data originating operations shown in FIG. 5, as shown at block 310. Once the user insertable addresses have been installed at block 316, inputs are validated to assure that there is a unique address number assigned to the NID as illustrated by blocks 318, 320, 322 and 324. If these conditions are not met, an error indication is generated, as indicated at block 320. To test for the address uniqueness as illustrated by block 324, each NID broadcasts to the other NID units with its same address. If another NID responds with the same address, an error indication is given. After a predetermined period of time, each NID broadcasts a "baton" packet, as indicated at blocks 326, 328 and 330 and in more detail in FIG. 4B.

Figure 4B:
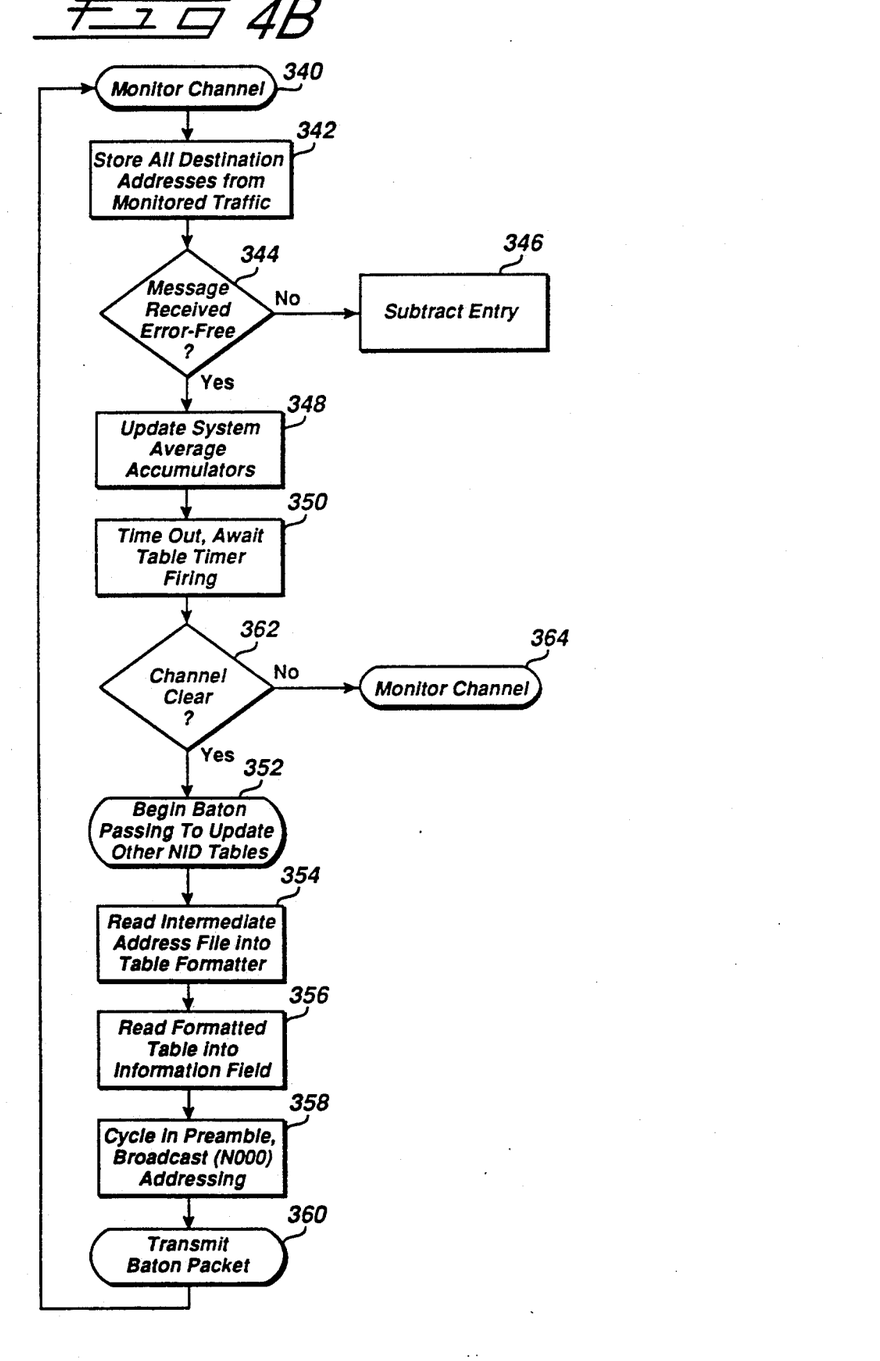

FIG. 4B is a generalized flow diagram illustrating the methodology and structural flow for the NID routing table update routine in which all the NID units are constantly monitoring network traffic by processing and analyzing destination or intermediate addresses among neighboring NID units. This is the first step in obtaining updates on how to access remote NID units through intermediate NID units where direct access is not available. The local traffic information is compiled and sent along to each individual network table by an itinerate "baton" packet which over the longer periods updates the entire system by sending out table update information. This baton packet is eventually passed along among all the NID units to inform each NID of routing within the local neighborhood, as well as also information about more remote NID units which are not within the reception range. Thus, remote or temporarily blocked NID units can seek an alternative means of communicating three intermediate NID units. Intermediate addresses are deduced from accumulating a high percentage of error-free traffic generated by neighboring NID units (see FIG. 6). Thus the baton packet represents a means for the system to automatically adjust to frequent changes, locally as well as globally in the network node topology and propagation conditions. Both of these conditions can be dynamic in the illustrated embodiment.

The background network routing table update routine of FIG. 4B begins with the monitoring of the communications channel as indicated at 340 and storing of destination addresses from the monitored traffic as indicated at 342 as well as testing to determine if the message is received error free as indicated at 344. If the message was not error free, the entry is subtracted as indicated at 346 and otherwise program flow proceeds to update the system accumulators as indicated at 348 and then wait for a timer firing as indicated at 350. Thus, the monitored traffic is converted into network table information by tallying the messages according to the number of times they were successfully received. This is done on a background processing basis and the information is enhanced by indexing (numerically dividing) the successful receipt of message packets by the total sum of all packets successfully received regardless of the address. After a predetermined period of time that the channel is clear, each NID asynchonously broadcasts its baton packet. This is illustrated at blocks 350, 352, 354, 356, 358, 360, 362 and 364. A destination address N000 signals to all system NID units that this is the baton packet containing table update information which is processed as an internal control message only, where N is the network address component. One of the purposes for broadcasting the baton to another NID is to assure that every NID is updated from different paths and at different times. This improves the efficiency and reliability of the table update technique, especially for updating NID units temporarily out of service. Also by distributing table update transmission responsibilities to each active NID, the system's ability to adapt to its changing propagation and topology is very high.

Figure 4C:
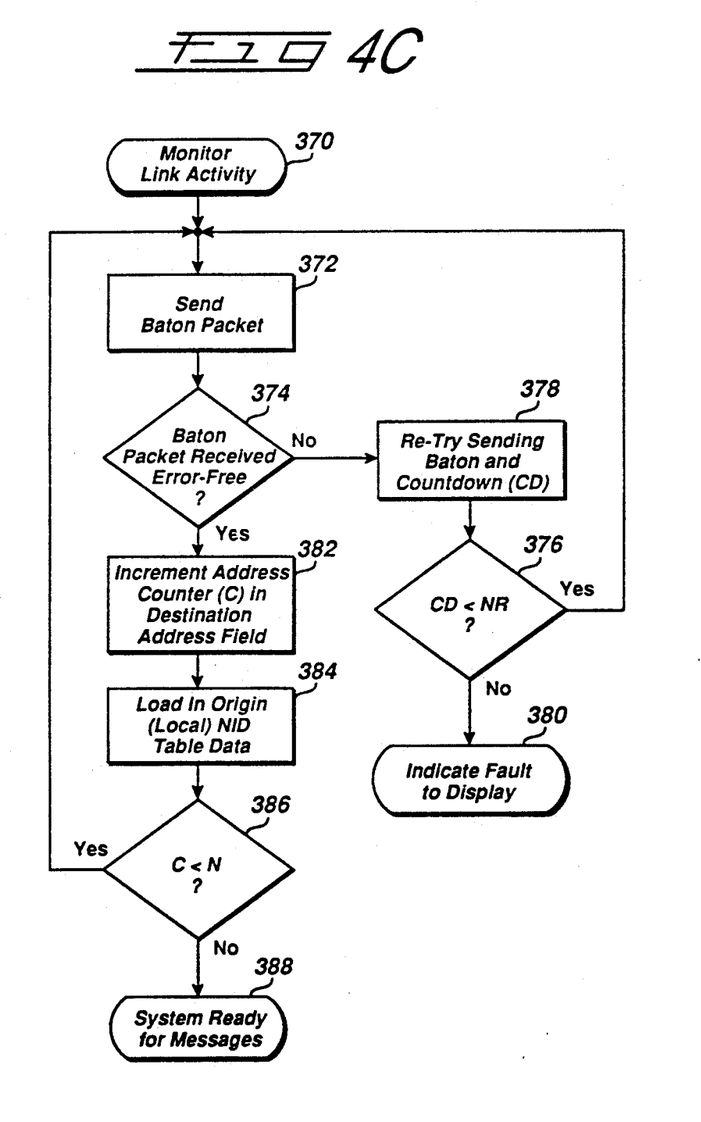

As illustrated in FIG. 4A at block 304, program flow can proceed from block 302 to the network table updating routine illustrated in FIG. 4 which illustrates the incremental addressing procedure when the network table update process is initiated. As illustrated by blocks 370, 372 and 374, the baton broadcasting process is repeated by each NID. If during the process an NID encounters an excessive number of retries (i.e., greater than a maximum allowed number of re-transmissions, NR) as determined at blocks 376 and 378, an error message is displayed as indicated at block 380. Once a successful baton packet transmission does occur resulting in an affirmative result at block 374, the new host NID increments the destination address as indicated at 382 above its own, eventually cycling through the entire network, as shown at block 386. Nonresponsive nodes are assumed to be installed but out of service. When such a node is brought back into service, it can immediately request a table update by having the desired destination node send back its table information before standard origin node message transmission takes place. After completion of the network table updating, program flow proceeds to a system-ready condition for transmission and reception of messages, as indicated at block 388.

Figure 5:
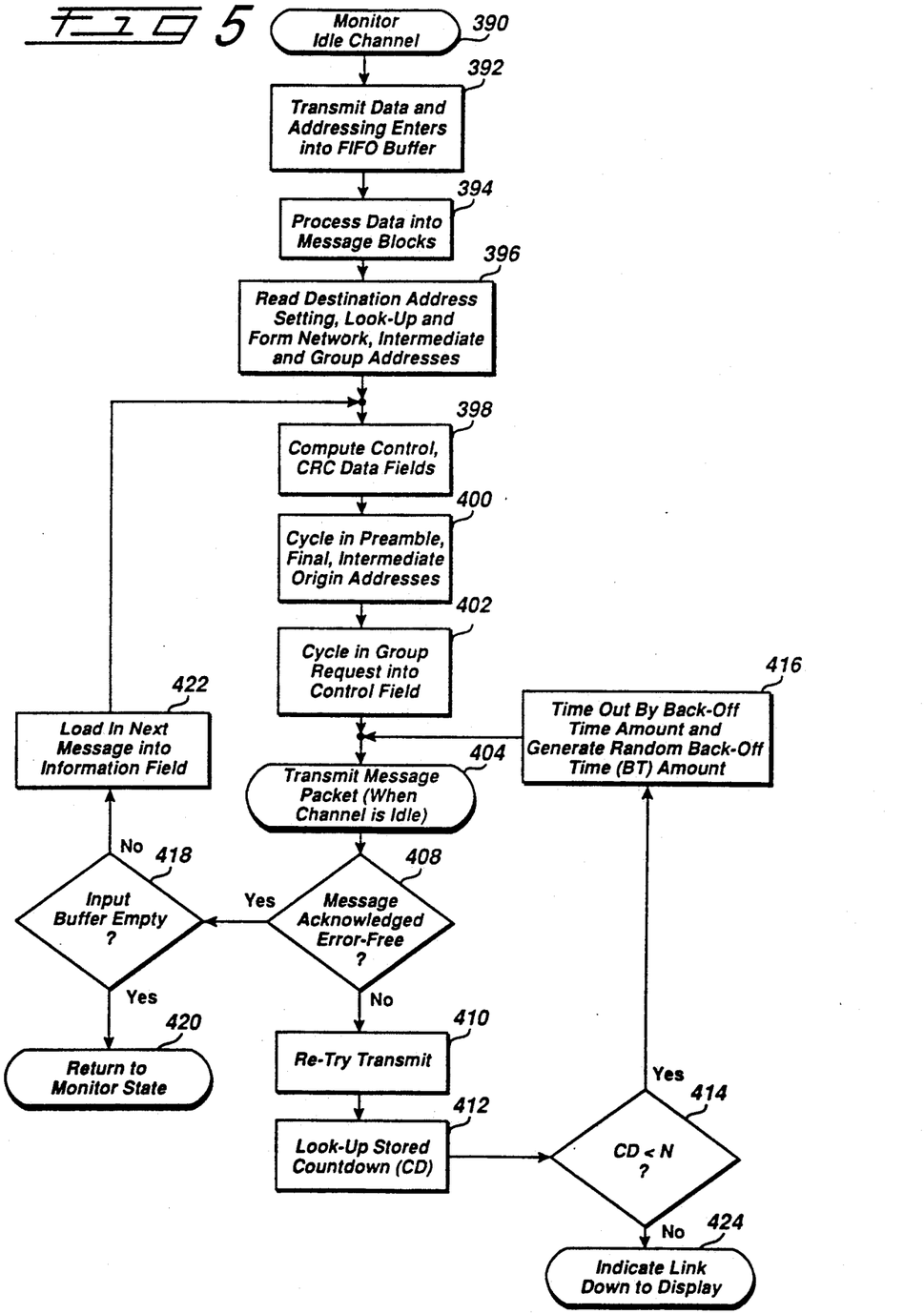
FIG. 5 is a flow diagram illustrating the processing methodology and structural flow for data originating by the processor for a specific embodiment of the infrared communication system according to the invention.

As shown in FIG. 4A, program control can branch to the data originating routine of FIG. 5 from several points, as illustrated by blocks 310 and 334 of FIG. 4A. FIG. 5 illustrates the methodology of a specific embodiment of a routine for the operational process by which data is packeted and assigned origin and destination addresses and, as required, intermediate addresses for communication between two NID units not in direct access to one anther. The routine of FIG. 5 begins, as illustrated by block 390, with the monitoring and detection of an idle channel after which the sequence of steps needed to properly prepare and transmit a message packet within the network is initialized as shown. The data and addressing to be transmitted is entered into the FIFO buffer and the data is processed into message packets as indicated at block 392 and 394. The NID next looks up the destination address in its table and an intermediate address if needed and loads the message and addresses into the transmission register, as indicated at 396. Afterward, a cyclical redundancy check (CRC) error code, preamble, and address information are appended to the message packet, and a control bit is inserted into the control field (which represents a request by the origin NID, to group, or couple, with a destination or intermediate NID) as indicated at blocks 398, 400 and 402.

The message packet is then transmitted as indicated at block 404 when the channel is sensed by the receiver to be idle. A test is then made to determine if the data was acknowledged as error free by the destination or intermediate NID as indicated at block 408 and the origin NID repeats the sequence until the input buffer is exhausted as indicated at 418 and 422. Once the input buffer is empty and all message information has been successfully transmitted, the NID returns to the channel monitoring state, as shown at block 420. If one of the message packets encounters an error in route, the destination or intermediate NID sends a no-acknowledge (NAK) signal. If no return signal is received within predetermined waiting time or if a NAK signal is received, a negative result will be produced at block 408 resulting in a retransmission of the packet as indicated at block 410 after a random amount of delay as indicated at blocks 410, 412, 414 and 416. If on the first attempt the packet is not successfully received by the destination NID, the process continues until a predetermined number of attempts are exhausted, as indicated at block 414, after which the NID indicates the link is down as indicated at block 424.

Figure 6:
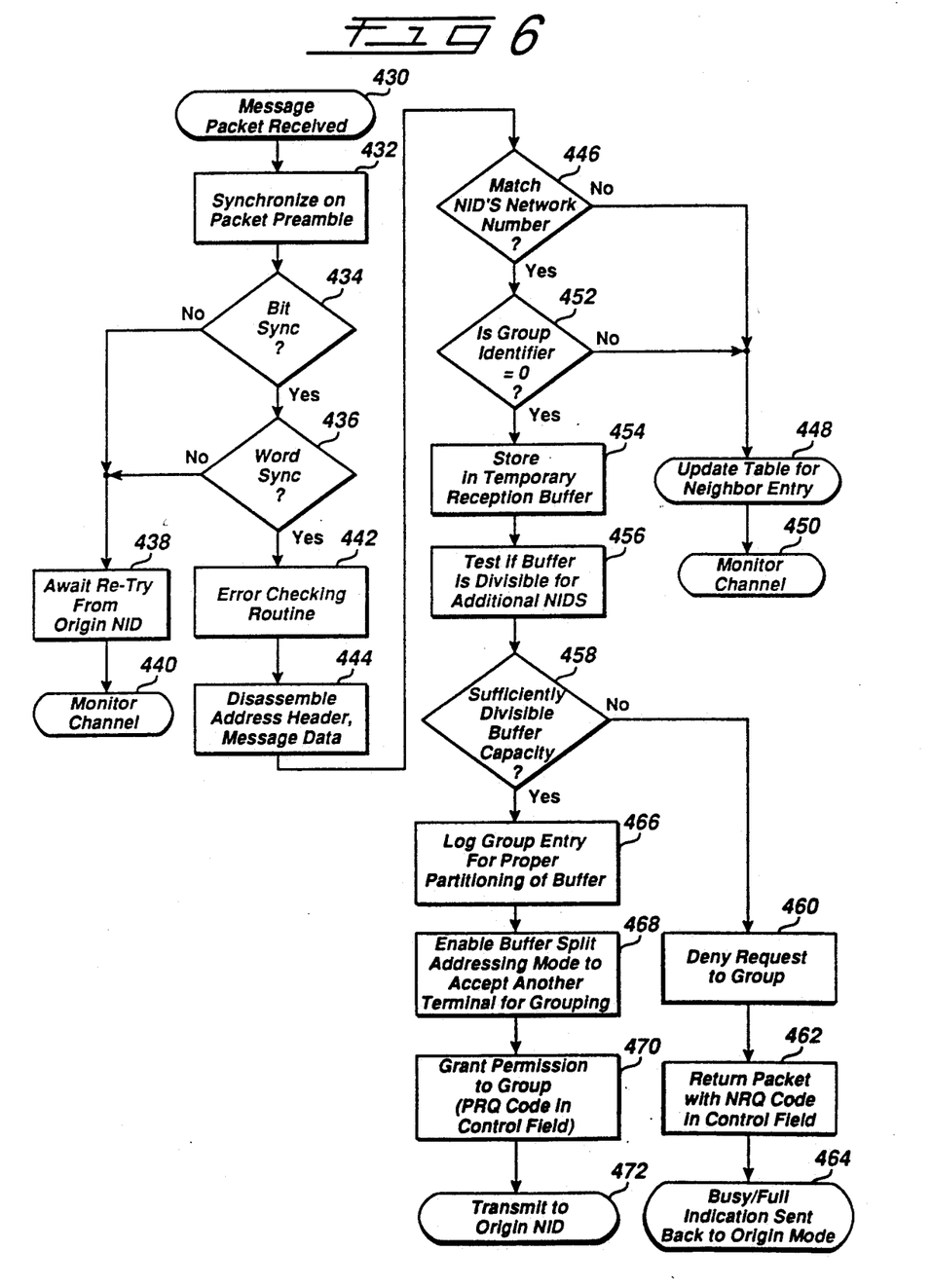
FIG. 6 is a flow diagram illustrating the processing methodology and structural flow for receiving operations controlled by the processor for a specific embodiment of the infrared communication system according to the invention.

Referring now to FIG. 6 there is shown a generalized flow diagram illustrating the methodology and structural flow for receiving operation of the NID. All NID units have holding buffers (RAM) for temporary storage of received data while awaiting output. In systems where the simultaneous communications are allowed, output NID units on frequently shared output devices will have a dynamically divisible buffer which stores data from several sending NID units while waiting to use the same output device.

As illustrated in FIG. 6, the receiving operation process begins at block 430 as shown where the message packet is received and synchronization operation is performed for bit and word synchronization at 432. As illustrated by blocks 434 and 436, a bit synch test is performed and a word synch test is performed to determine if bit and word synchronization have both been successfully accomplished. If the result is negative, the receiver awaits a retransmission from the origin NID thereby continuing to monitor the channel as shown at blocks 438 and 440. If synchronization has been successfully accomplished, program flow proceeds to block 442 where error checking is performed and then the message packet is disassembled into discreet fields, each containing the formulated addressing, arbitrary data, control, information and error information, as indicated at block 444. Tests are then performed at blocks 446 and 452 to determine if the destination and intermediate address matches that of the receiving NID and to see if the group identifier is equal to zero. If either of these result in a negative, the processor adds the incident to the network table accumulator for update and proceeds to the channel monitoring condition, as illustrated by blocks 448 and 450. If the result is affirmative indicating the received message packet matches the local NID address and has a positive group identifier condition, the transferred data is stored into a reception buffer as indicated at 454 to await transfer to the NID terminal or output device in the same order that it was received. The buffer is then tested to see if it is divisible for storage of data from additional NID units for those NID units where there is a larger buffer provided to store data from several original NID units. If the result is affirmative, the steps 466, 468 and 470 set up dynamic storing of the data based on the origin NID units unique address. There are a predetermined number of buffer partitions in which the same number of different NID units originating data can be simultaneously served. In the case where there is insufficient buffer capacity at step 458, the destination or intermediate NID denies the request to the group with the origin NID and returns a packet with a NRQ (request denied) signal which the origin node will interpret as a temporarily busy/full indication, as illustrated by blocks 460, 462 and 464.

Figure 7:
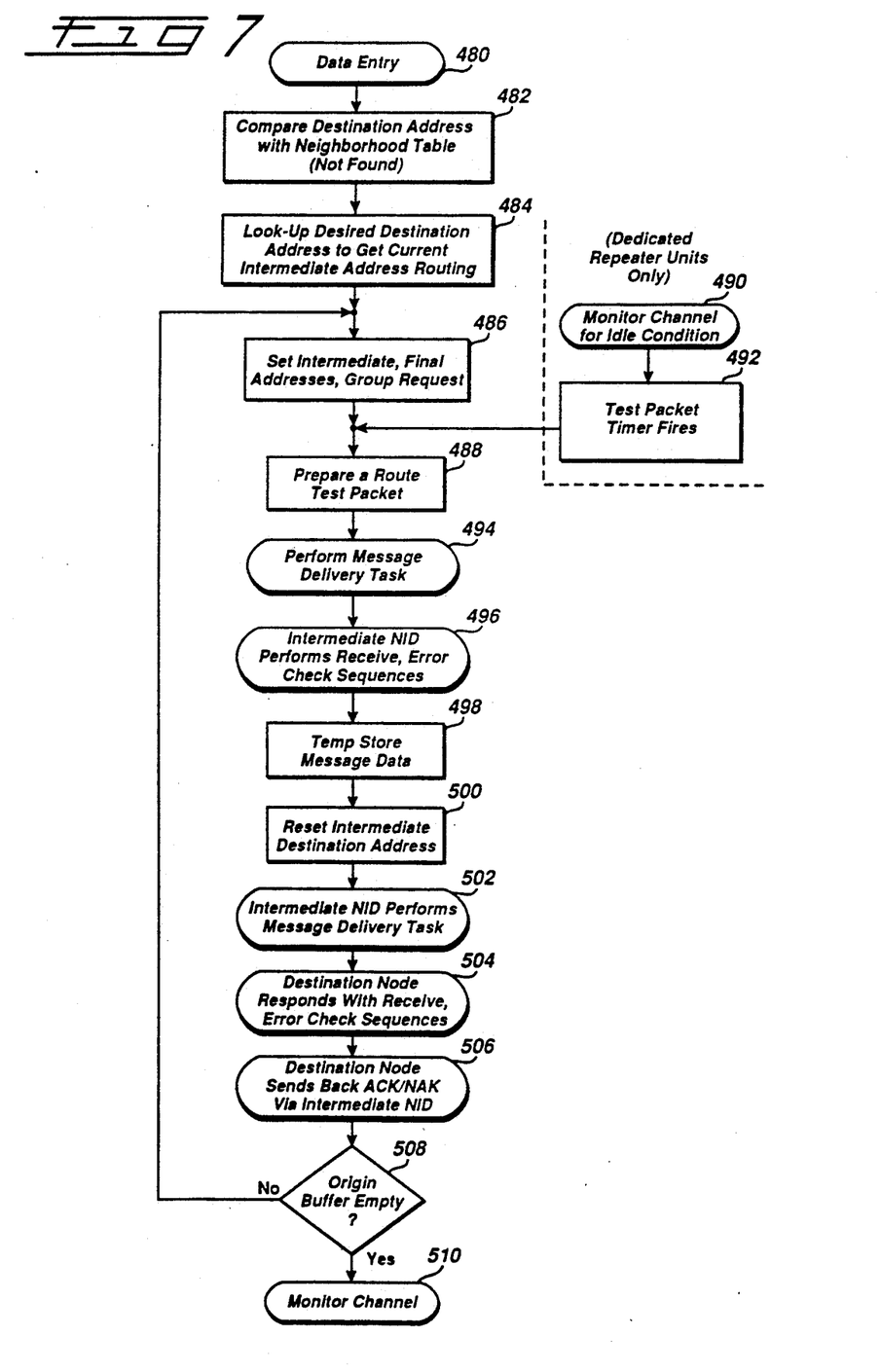
FIG. 7 is a flow diagram illustrating the processing methodology and structural flow for store and forward operations by the processor for a specific embodiment of the infrared communication system according to the invention.

FIG. 7 is a generalized flow diagram illustrating the methodology and structural flow for a specific embodiment of the store and forward repeater transceiver operation which illustrates the operation of NID transceivers when operating as repeaters in cases where messages are passed through the network with the use of intermediate addresses. The sequence of operations in the situation where a message packet must transfer through an intermediate address NID to reach a desired destination NID which is beyond direct access range is shown beginning at block 480 of FIG. 7. There are also dedicated repeater NIDs which have no terminal or output device connected to them. These are a special case of the standard NID acting as an intermediate and, as such, are also described with reference to FIG. 7.

After data entry at 480, the message packet is compared to the destination address with the neighborhood table and where not found, the desired destination address in the network table of the neighboring direct access destination addresses, the search is made for the desired destination address by looking up the destination NID address in the intermediate address table as shown at 482 and 484. If this search results in a match, the origin NID will place this intermediate address in the field reserved for the intermediate address as indicated at 486 along with the final addresses and group requests. A test packet is then formed to ask the intermediate address NID if the destination NID is available for grouping with it at indicated at 488 and also to verify end to end linkage by preparing a second test packet for transmission to the ultimate destination node. Once received by the intermediate NID after transmission as indicated at 494, an error check is performed as indicated at block 496. Assuming that the test packet is error free, it is temporarily stored as indicated at 498 and in the intermediate NID while the intermediate address is converted to a destination address for the second hop transmission as indicated at block 500. Assuming that error-free delivery, and that the request to group is acknowledged, an acknowledge signal is returned via the intermediate node to tell the original node that the route between the three nodes is established as illustrated by blocks 502, 504 and 506. Subsequently, the regular message data can begin to flow across the connection. At this point, the standard sequence as described in the flow charts of FIGS. 1–5 is followed. The only special feature is the temporary storage and address manipulation at the intermediate NID following each origin to intermediate NID transfer. The process continues until the origin buffer is depleted as shown at block 508 after which process control returns to monitoring the channel as shown at 510. In the case of a dedicated repeater NID, a periodically timed test packet is sent out during periods of inactivity on the channel which are detected by monitoring the channel for idle condition as shown at blocks 490 and 492. Thus, the repeater NID refreshes its presence in the neighboring NID network tables in case the dedicated repeater remains inactive for relatively long periods.

Figure 8:
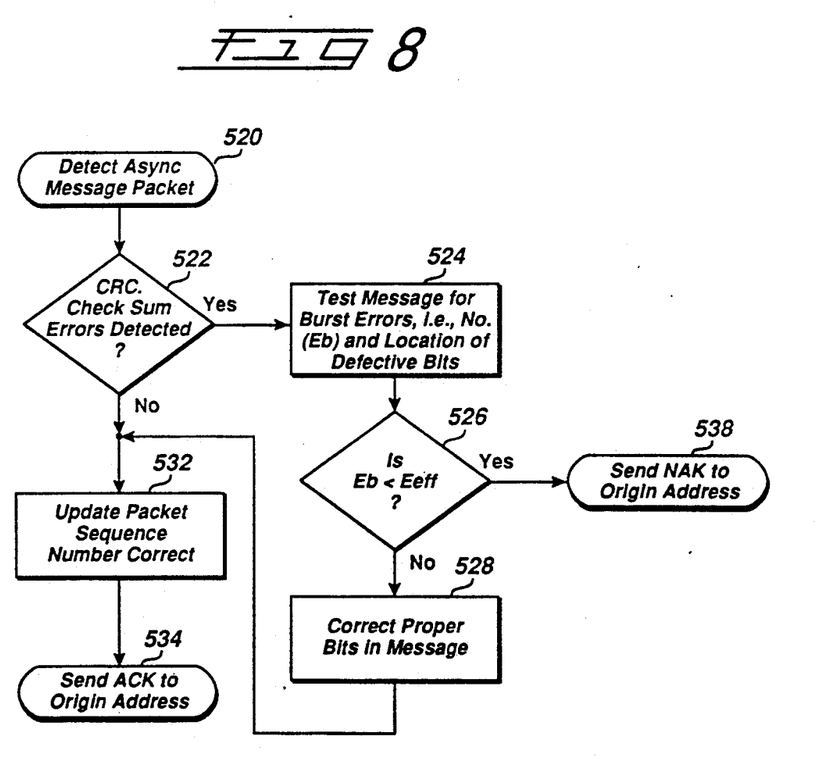
FIG. 8 is a flow diagram illustrating the processing methodology and structural flow for error control by the processor for a specific embodiment of the infrared communication system according to the invention.

Referring now to FIG. 8 there is shown a generalized flow diagram illustrating the methodology and structural flow for error control processing at each NID. The error control process is performed on every incoming message packet and begins, as shown at block 502, with detection of the asynchronous message packet. Once the asynchronous data is received, a CRC/check sum error check is performed, as indicated at block 522, and if an error is detected, a test is made to determine if the total number of errors sensed in the packet is more than a predetermined number of errors, as shown at blocks 524 and 526. Depending upon the total number of errors sensed in the packet, the data is corrected locally, as illustrated at block 528. If the number of errors exceeds the predetermined number (e.g., the number of errors which if reached dictates excessive time to correct), the no NAK signal is sent back to the origin node to induce a packet retransmission, as shown at block 538. The packet sequence number test is performed if errors are not detected, as illustrated by block 532, to ensure correct ordering of consecutive message packets. The data within the control field contains an order number representing the current message packet count. Once received, the NID updates its counter to compare against the next packet received, as shown at block 532 and as illustrated at block 534, an acknowledge is sent to the origin NID address.

Specific embodiments of the novel infrared communication system according to the invention has been described for the purposes for illustrating the manner in which the invention may be made and used. It should be understood that implementation of other variations and modifications of the invention in its various aspects will be apparent to those skilled in the art and that the invention is not limited by the specific embodiments described. It is therefore contemplated to cover the present invention any and all modifications, variations or equivalents that fall within the spirit and scope of with the basic underlying principles disclosed and claimed herein.

What is claimed is:

1. An infrared transceiver for use in a two-way communication system for transfer of data between a plurality of terminals, each terminal having one of a plurality of infrared transceivers coupled thereto, said transceiver comprising:
   means for coupling data to the transceiver from a terminal coupled to the transceiver;
   infrared transmitting means for transmitting an infrared signal at a common carrier frequency including means for modulating the infrared signal with the data and with an origin address and a destination address each address comprising at least two address components;
   means for storing address components unique to each transceiver;
   infrared receiving means for recovering said data and addresses by detection of infrared signals transmitted on the common carrier from another of the plurality of infrared transceivers;
   means for generating an acknowledge signal and for activating the transmitting means to selectively transmit the acknowledge signal in response to the addresses matching the stored address components.

2. The transceiver of claim 1 further comprising means for storing recovered data transmitted from another transceiver.

3. The transceiver of claim 2 wherein the transmitting means further comprises means for transmitting an intermediate address and wherein the transceiver further comprises means for activating retransmission of stored data in response to the intermediate address.

4. The transceiver of claim 2 further comprising means for transferring data from the transceiver to a terminal coupled thereto, and means for deactivating the means for transferring data in response to the destination address.

5. The transceiver of claim 1 further comprising means for error correction encoding the data and addresses before transmission, and means for error detection and error correction of the received data and addresses after reception.

6. The transceiver of claim 5 further comprising means for forming the data and the addresses into a data packet of predetermined format including a synchronization preamble and error correction check characters.

7. The transceiver of claim 1 further comprising means for detecting that an obstruction prevents the infrared signal from propagating to a selected transceiver, and means for identifying and utilizing another of the plurality of transceivers as an intermediate transceiver to function as a repeater to create a propagation path avoiding the obstruction.

8. The transceiver of claim 2 wherein the means for storing recovered data comprises a dynamically divisible buffer permitting storage for recovered data from a plurality of different transceivers.

9. The transceiver of claim 2 further comprising a storage buffer for storing data coupled to the transceiver from a terminal coupled thereto.

10. The transceiver of claim 6 wherein the data packet comprises a preamble, a synchronization word, a final destination address, an intermediate address, an origin address, a control field, a packet number, an information field and error correction check characters.

11. The transceiver of claim 10 wherein the transmitting means comprises means for transmitting the data packet as a Manchester encoded serial bit stream by intensity modulating an incoherent infrared carrier with a coherent data subcarrier.

12. The transceiver of claim 5 further comprising means for activating transmission of a no acknowledge signal in response to detection of greater than a predetermined number of errors in the received data.

13. The transceiver of claim 12 further comprising means for activating retransmission of data in response to a failure to receive an acknowledge or no acknowledge signal within a predetermined time after transmission of the data.

14. The transceiver of claim 10 wherein each address comprises the sum of a network address component, an individual terminal address component and a group identifier component.

15. The transceiver of claim 1 further comprising means for storing and subsequently retransmitting data recovered by the receiving means.

16. The transceiver of claim 15 further comprising means for monitoring transmissions of other transceivers transmitting on the common carrier on a direct optical path, and for storing address information recovered from monitored transmissions to create a local routing table.

17. The transceiver of claim 16 further comprising means for periodically transmitting address information thereby permitting dedicated store and repeater operation.

* * * * *